July 9, 1963
T. W. NICHOLSON
3,096,799
SLAB BARKING MACHINE
Filed March 28, 1960
4 Sheets-Sheet 1
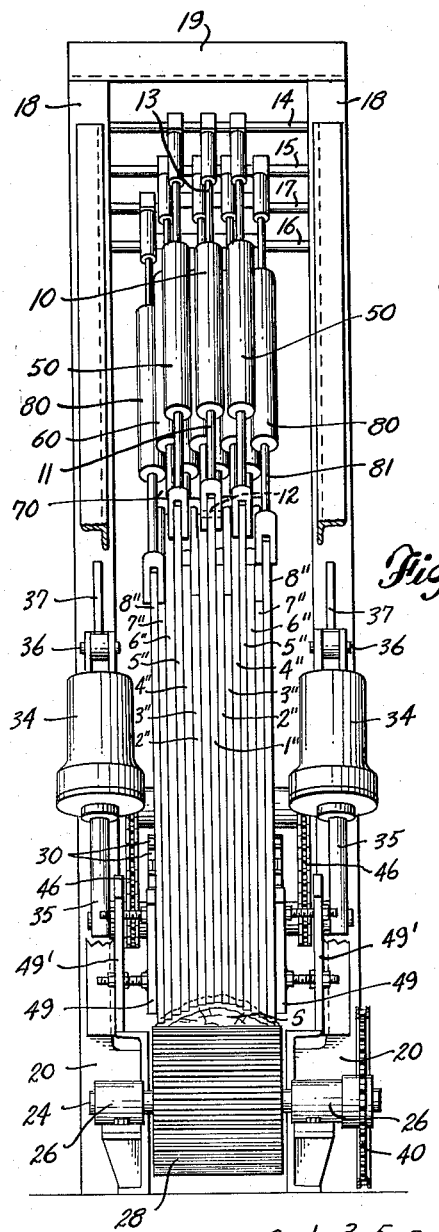
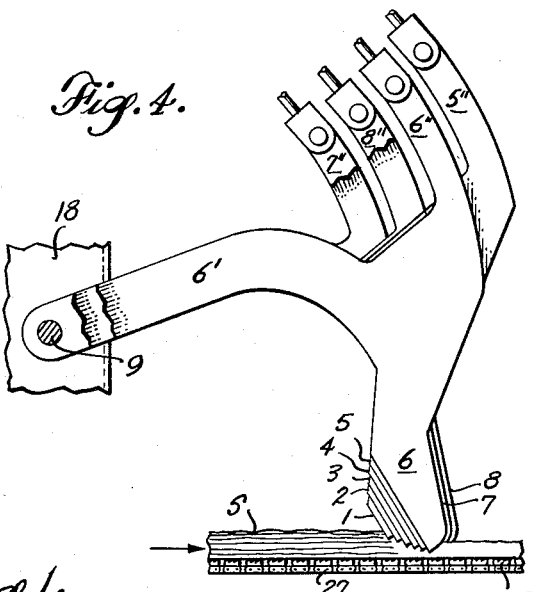
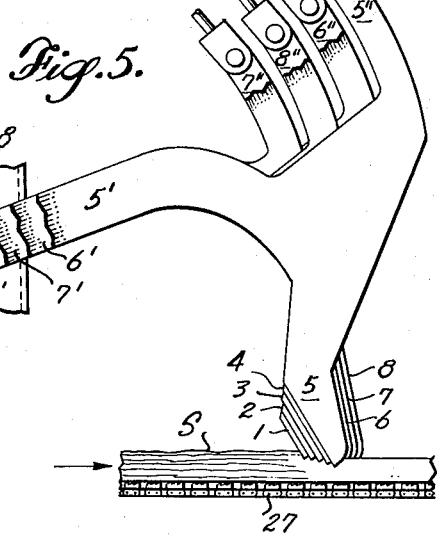
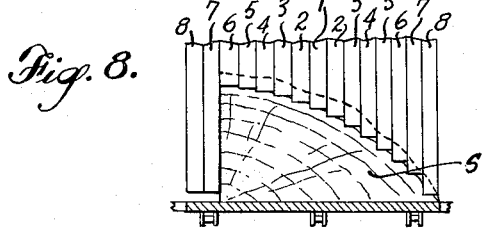
INVENTOR.
THOMAS W. NICHOLSON
BY
Reynolds, Beach & Christensen
ATTORNEYS

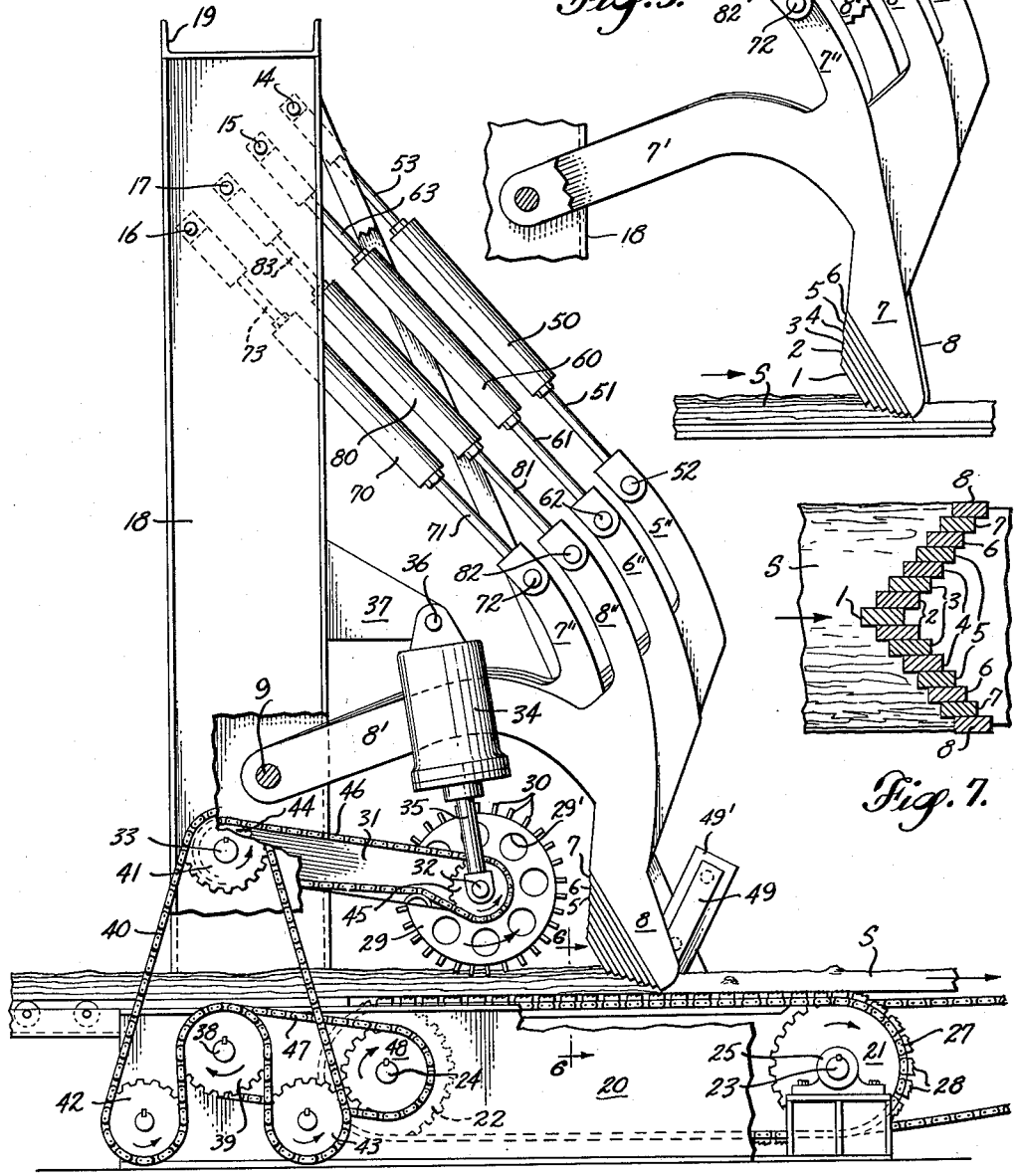

July 9, 1963
T. W. NICHOLSON
3,096,799
SLAB BARKING MACHINE
Filed March 28, 1960
4 Sheets-Sheet 3
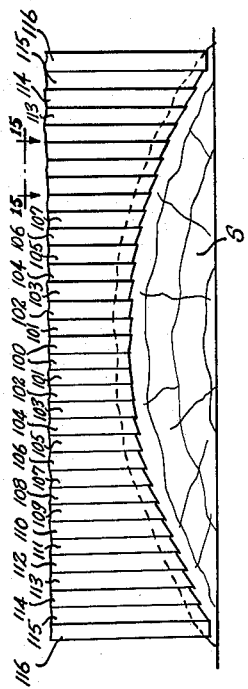
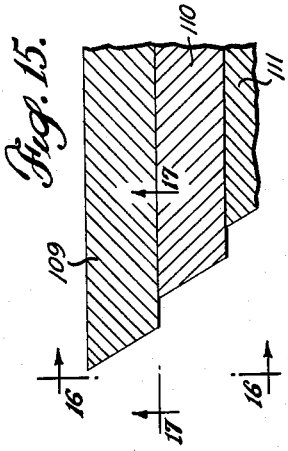
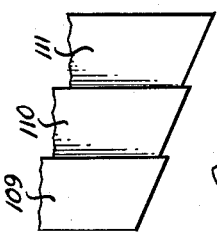
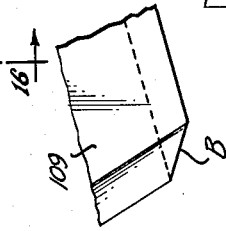
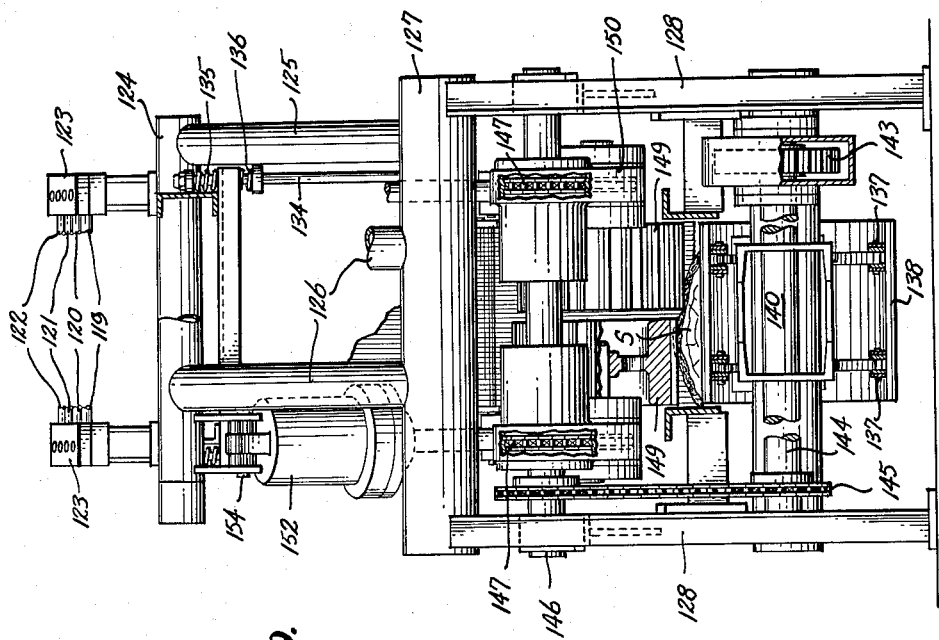
INVENTOR.
THOMAS W. NICHOLSON
BY
Reynolds, Beach & Christen
ATTORNEYS

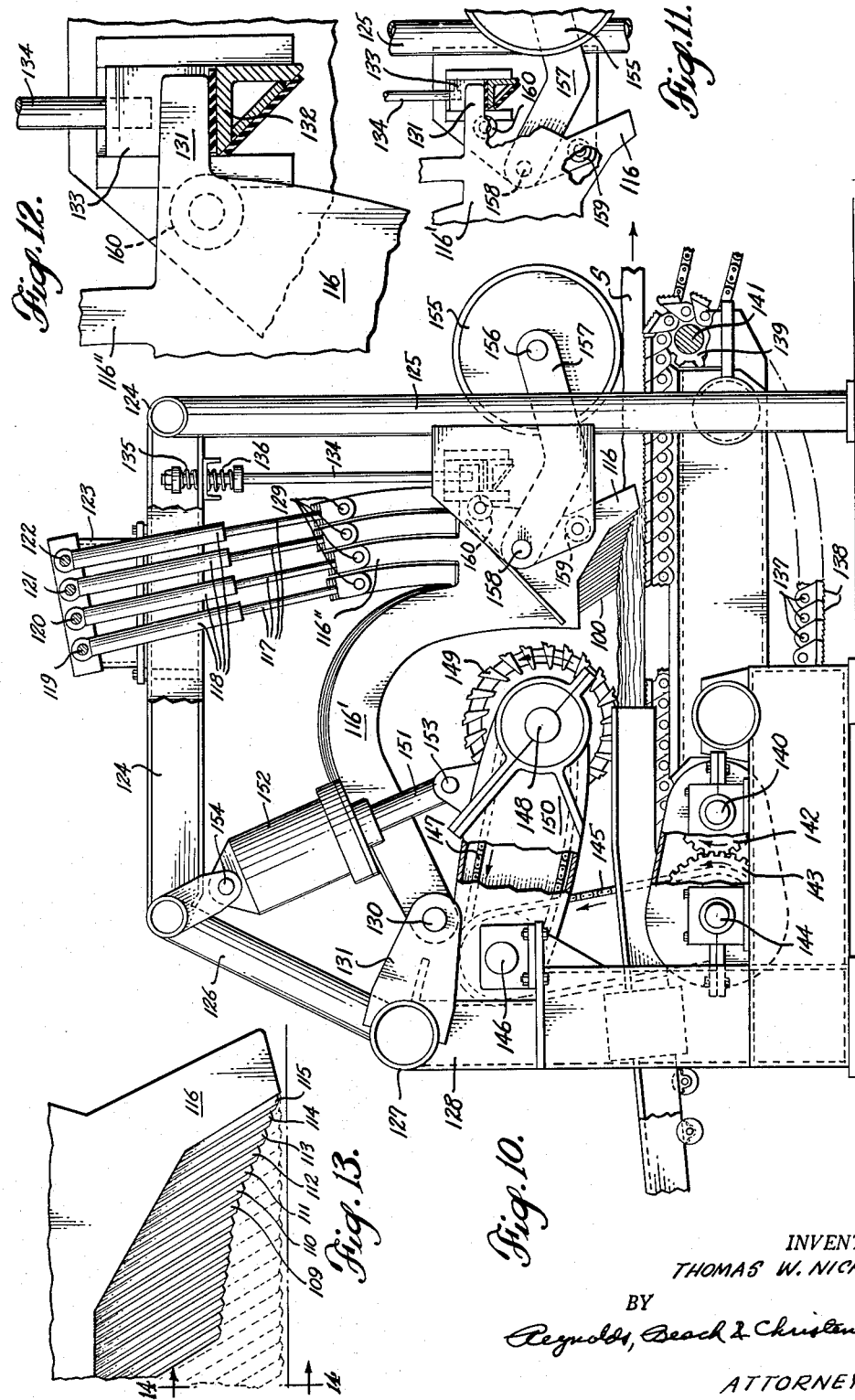

United States Patent Office 3,096,799
Patented July 9, 1963

3,096,799
SLAB BARKING MACHINE
Thomas W. Nicholson, 2525 A St. SE., Auburn, Wash.
Filed Mar. 28, 1960, Ser. No. 18,088
7 Claims. (Cl. 144—208)

The present invention relates to a machine for removing the bark from slabs of logs having at least one flat side as distinguished from logs which are of generally cylindrical shape.

A principal object of the present invention is to provide such a barking machine, the barking components of which will adjust automatically to accommodate slabs of different widths and thicknesses as well as slabs which vary substantially in thickness and/or width from end to end. Moreover the barking components will be moved into barking position automatically by a slab being fed through the machine.

A further object is to provide such a slab barking machine in which the barking components adjust their positions automatically to accommodate varying slab contours and which barking components will contact intimately irregular slab surfaces so as to remove the bark cleanly with a minimum of wood paste, irrespective of the thickness of the bark and the number of protuberances on the slab and their arrangement. A specific object is to enable the pressure exerted by the barking components on the slab to be varied at will in order to accomplish the most effective bark removal with the least mutilation of the wood.

An important object is to provide such a machine which will remove bark from slabs quickly and effectively enabling slabs to be processed at high speed.

Despite the advantages of this machine, it is rugged, compact and reliable in operation and does not require delicate control equipment to regulate its operation.

Another advantage of the machine is that it effectively clears away the bark removed from the slabs so that its operation need not be interrupted frequently for cleaning. Nevertheless the barking components can be retracted readily from the path of the slabs through the machine whenever desirable.

A preferred construction of the machine includes a slab conveyor for carrying slabs through the machine and a cluster of hoes arranged in side-by-side relationship supported for movement toward and away from the slab conveyor and adapted to bear on and scrape the bark from slabs moved through the machine by the slab conveyor. Each hoe is movable relative to the slab conveyor so as to enable it to engage a slab irrespective of the thickness and irregularity of the slab. A hold-down is arranged to press each slab against the slab conveyor so that it will be in the proper attitude relative to the barking hoes. Each hoe can be retracted from the path of slabs through the machine and each hoe can be pressed with predetermined yieldable force toward the slab conveyor to exert an adequate pressure on the slab to effect proper barking action. Preferably the hoes are arranged in wedge-shaped relationship so that they form a segmented, generally chevron-shaped barking plow of a width at least as great as the widest slab to be barked and having its central portion leading and flaring therefrom toward its side portions.

FIGURE 1 is an end elevation view of the slab barker with parts broken away, and FIGURE 2 is a side elevation view of the slab barker, also having parts broken away.

FIGURE 3 is a fragmentary side elevation view of the cluster of barking hoes with the nearest hoe broken away, FIGURE 4 is a similar view with the two nearest hoes broken away, and FIGURE 5 is a similar view with the three nearest hoes broken away.

FIGURE 6 is a sectional view through a portion of the machine taken on line 6—6 of FIGURE 2, and FIGURE 7 is a horizontal sectional view taken on line 7—7 of FIGURE 6.

FIGURE 8 is a sectional view through a portion of the machine similar to FIGURE 6 and taken on line 6—6 of FIGURE 2, showing the barking hoes in a different relationship.

FIGURE 9 is an end elevation view of a modified type of slab barker, parts being broken away, and FIGURE 10 is a side elevation view of such modified type of slab barker, also having parts broken away.

FIGURE 11 is a detail side elevation view of a portion of the modified machine, with parts broken away, and FIGURE 12 is a side elevation view of parts of this same structure, with parts broken away, shown on an enlarged scale.

FIGURE 13 is a fragmentary enlarged side elevation view of the slab-engaging portion of the modified barking machine, and FIGURE 14 is an elevation view taken on line 14—14 of FIGURE 13.

FIGURE 15 is a horizontal sectional view through a portion of the barking plow taken on line 15—15 of FIGURE 14, FIGURE 16 is an elevation view taken on line 16—16 of FIGURE 15, and FIGURE 17 is an elevation view taken on line 17—17 of FIGURE 15.

The slab barking machine of both types shown in the drawings employs as the barking component a segmented plow formed by a cluster of plate-shaped hoes arranged in face-to-face relationship. Such hoes also preferably are arranged in edgewise stepped relationship, as shown in FIGURE 7, so that the hoes are swept from the central hoe 1 toward the extreme side hoes in the direction of movement of the slab S through the barking machine forming a segmented, generally chevron-shaped barking plow having its central portion leading and flaring therefrom toward its side portions as indicated by the arrow in FIGURE 7. Such hoes are numbered in FIGURE 7 from 1 to 8, inclusive, progressively from the center hoe. While it has been found that fifteen hoes arranged in the manner shown in FIGURE 7 to form a segmented plow are satisfactory, there could be, of course, a larger or smaller number of hoes and these could be thicker or thinner depending upon the desires of the manufacturer and users and the type of slab being barked.

Each hoe plate is of approximately T-shape and includes a generally horizontal supporting arm designated 5′, 6′, 7′, and 8′ for the plates of the several hoes 5, 6, 7 and 8, respectively, such supporting arm forms the stem portion of its plate. All of such supporting arms are mounted on a common pivot rod 9 about which the T-heads of the hoe plates swing to move such heads up and down as may be desirable to effect the most satisfactory barking operation. A control horn numbered 1″ to 8″ in FIGURES 1, 3, 4 and 5 extends upwardly from each of the hoes 1 to 8, respectively, as shown best in FIGURES 2 to 5, so that the hoe and the control horn of each T-shaped hoe plate cooperatively form the cross member of its plate. The horizontal supporting arm stem portion of each plate and such cross member of each plate are approximately equal in length, as shown in FIGURES 2 and 10. An upward force is exerted on these control horns when it is desired to lift the corresponding hoes by swinging them upward about the axis of pivot rod 9 and a downward force is exerted on such control horns when it is desired to increase the pressure of the hoes on the slab. Because the control horn and the hoe are generally in alignment the force produced by such actuator will be exerted substantially directly in compression along the lengths of such members, enabling great force to be exerted by the hoe on the slab without substantial bending stress being produced in the arm.

For exerting an upward or a downward force on the hoes in this fashion, elongated actuators are utilized which preferably are of the pressure-fluid piston-and-cylinder type. Such actuators, designated 10, 50, 60, 70 and 80, for the hoes 1, 5, 6, 7 and 8, respectively, are shown in FIGURES 1 and 2. The width of each actuator cylinder perpendicular to the plates of such hoes is greater than the thickness of the plate to which it is connected. To enable such actuators to be disposed in substantially parallel arrangement, the control horns of adjacent plates are offset transversely of the actuators in the direction parallel to the hoe plates and the actuators which are adjacent transversely of the hoe plates are correspondingly off-set. Such actuators include plungers 11, 51, 61, 71 and 81 for the actuators 10, 50, 60, 70 and 80, respectively, which are connected to the control horns 1″, 5″, 6″, 7″, and 8″ by pivots 12, 52, 62, 72 and 82, respectively. The cylinders of such actuators 50, 60, 70 and 80 are connected by anchor rods 53, 63, 73 and 83 to pivot rods 14, 15, 16 and 17, respectively. These pivot rods are supported by and extend between posts 18 of the machine frame, the upper ends of which are connected together by the cross member 19 shown in FIGURE 1.

The uprights or posts 18 project upwardly from base members 20 which, as shown in FIGURE 1, are spaced apart to receive between them sprockets 21 and 22 which are mounted on axles 23 and 24, respectively. Such axles in turn are carried by the base members 20, such as by being journaled in bearings mounted on the base members. Shaft 23 is shown as being journaled in bearings 25 and shaft 24 is journaled in bearings 26. These sprockets are interconnected by the chain 27 of a slab supporting and feeding conveyor. The chain 27 carries bars 28 having teeth arranged to grip and drag in the direction indicated by the arrow in FIGURES 2, 3, 4, 5 and 7 a slab supported by the conveyor chain bars.

To improve the traction on the slab, an upper roller-type hold-down 29 shown in FIGURE 2 may be provided which has arranged about its periphery cleats 30 adapted to engage the upper surface of the slab. The hold-down is carried by arms 31 supporting the opposite end portions of the roller axle 32. These arms are pivotally supported by the shaft 33 to enable the hold-down to be raised and lowered. Such elevational adjustment of the hold-down can be effected by a fluid-operated piston-and-cylinder actuator 34 having a plunger rod 35 pivotally connected to the axle 32 of the hold-down roller, if such actuator is of the double-acting type. Preferably two of such actuators are provided, one at each end of the axle 32 as shown in FIGURE 1. The upper end of each actuator 34 is supported by a pivot 36 from a bracket 37 projecting from an upright 18. If the actuator 34 is of only the single-acting type, such actuator would only be effective to increase the tractive force of the hold-downs on the slabs by pressing them downward.

Preferably the hold-down rollers 29 are of the live type so that, instead of exerting a drag on the slab S being fed through the barking machine, they actually would contribute toward the feeding action. Consequently, it is preferred that the rollers 29 be rotated positively and in synchronism with the movement of the conveyor chain 27. The drive for both the hold-down rollers and the slab conveyor may be effected by a drive shaft 38, shown in FIGURE 2, carrying a sprocket 39 which engages a chain 40. Such chain extends around the sprocket 41 which is mounted on shaft 33 and also around sprockets 42 and 43 to hold the chain 40 in engagement with sprocket 39. Sprocket 44, also mounted on shaft 33, and sprocket 45 mounted on shaft 32 carry chain 46 which interconnects the shafts 32 and 33.

Chain 47 extends around another sprocket on shaft 38 and around sprocket 48 on shaft 24 which carries the conveyor sprocket 22. As shaft 38 and sprocket 39 are turned in the direction indicated by the arrow, therefore, sprockets 41, 42 and 43 will be turned oppositely in the directions indicated by the arrows. Chain 46 will drive sprocket 45 to turn the hold-down roller 29 in the direction indicated by the arrow to assist in feeding the slab through the machine by engagement with its upper surface. Simultaneously, chain 47 will turn sprocket 48 on shaft 24 in the direction indicated by the arrow to move the upper stretch of chain 27 to the right as seen in FIGURE 2 for feeding the slab through the machine.

As shown in FIGURE 7, the hoe plates 1 to 8, inclusive, are arranged in face-to-face stepped relationship so as collectively to form a wedge-shaped or chevron-shaped formation in which the central hoe 1 is engaged first by a slab being fed through the machine by the conveyor 27 and the hold-down roller 29. These hoe plates thus cooperate to form a segmented plow which is symmetrical about an upright central plane parallel to the direction of movement of the slab. Slabs cut from the sides of logs have a contour generally like that shown in FIGURE 6. Since the individual hoes are movable independently toward and away from the slab conveyor, the height of the individual hoes will be adjusted automatically so that each hoe bears directly on the slab. Consequently, a hoe closer to the center of the slab will be higher than a hoe closer to an edge of the slab, as shown in FIGURE 6.

FIGURE 2 shows that the edges of the hoes 8 closer to the pivot 9 are inclined downwardly in the direction of slab feed so that as a slab end engages each hoe, it will wedge that hoe upwardly until its lower end rides onto the upper surface of the slab. The wedge arrangement of the hoes is desirable so that an excessive force resisting feed of the slab will not be produced by simultaneous initial engagement of too many hoes with the slab. Instead, the hoe 1 will be engaged first and, as it is moved upward onto the upper surface of the slab, the two hoes 2 will be engaged next, and then the hoes 3, and so on, until the hoes 8 are engaged and wedged upward to bear on the upper surface of the slab. Such lifting of the hoes will, of course, be against the resistance created by the fluid pressure actuators 50, 60, 70, 80, etc., and upward movement of the hoes will be guided by swinging of the supporting arms 1′ to 8′, respectively, about the axis of the pivot rod 9.

In order to produce the desired barking action of the hoes 1 to 8, inclusive, fluid under pressure, which is preferably compressed air, will be supplied to the upper ends of the various piston-and-cylinder actuators 50, 60, 70, 80, etc., connected to the respective hoe plates to exert a downward force on the hoes sufficient to enable them to scrape the bark cleanly from the slab S with minimum damage to the slab. The pressure of the hoes on the sloping sides of the slab will tend to urge the hoes down the incline so as to separate them. In order to insure removal of all the bark from the slabs, it is desirable to maintain them in intimate face-to-face engagement. Consequently, backing plates 49 are mounted along opposite sides of the pack of hoe plates which engage the outside hoes 8 in various elevated positions so as to prevent spreading movement of such hoes. These hoes, in turn, will prevent spreading of the two hoes 7 which in turn will prevent spreading of the two hoes 6, and so on, so that the entire pack of hoe plates will be retained in face-to-face engagement. As shown in FIGURE 1, the backing plates 49 are supported adjustably from mounting plates 49′ by bolts which can be shifted to move the backing plates 49 inward or outward for the purpose of regulating the amount of clearance permitted between the plates.

If a slab is cut from a cant it will have at least two flat sides as illustrated in FIGURE 8. In that event, one or more of the hoes can extend downward past the upright flat side and the remainder of the hoes will be raised to ride on and scrape the bark from the upper surface of the slab. When acting on such a slab, it is necessary to provide stop means for limiting downward movement of the hoes sufficiently to enable them to engage the slab conveyor. The actuators 50, 60, 70, 80, etc. can be constructed to limit such downward movement so that even when there is no slab on the conveyor all the hoes will be held in lowermost positions clearing such conveyor.

Another advantage in arranging the hoe plates in the wedge-shaped stepped relationship shown in FIGURE 7 is that the hoes will cooperate to act as a plow by shearing the loosened bark toward the edges of the slab. In order to enable the slab to be fed properly and the hoes to be most effective, it is important that the holddown roller 29 be located close to the hoes. A greater or lesser amount of bark will be loosened by the action of the hoes before that bark actually reaches the hoes. Such loosened bark normally would tend to pack between the cleats 30 of the hold-down roller, which would greatly reduce its traction. Consequently, these cleats have spaces between them extending into the interior of the roller instead of only grooves being formed between the cleats. Therefore, bark will be forced into the central portion of the roller and holes 29' may be provided in the end plates of the roller through which pieces of bark can be discharged from its interior.

In the barking machine shown in FIGURES 1 to 8, inclusive, the scraping ends of the hoes 1 to 8, inclusive, are formed with scraping corners which are perpendicular to the opposite faces of the hoe plates. Consequently, these corners do not engage the surface of the slab uniformly across their full width and for that reason the thickness of each plate should not be great. While the convexity of the bark surface of a slab varies from slab to slab as well as the irregularity of the slab surface, a more uniform engagement of the hoe barking corners with the slab bark surface can be obtained if the ends of the hoes are beveled to a shape which would conform to the contour of an average slab. The modified barking machine shown in FIGURES 9 to 17, inclusive, has a greater number of barking hoes which are thinner and the lower ends of which are beveled oppositely from the center, as shown in FIGURE 14, so as to conform much more closely to the contour of a slab being barked.

In FIGURE 14 the hoes are numbered from 100 at center to 116, inclusive, at the sides and the lower ends of the hoes toward the outer sides are beveled to a greater extent than the hoes toward the center except for the extreme outer hoes. The slab shown in FIGURE 14 is somewhat thinner and has a convex surface with a greater radius than the average slab. Moreover, the curvature of the left portion of this slab has a greater radius than the curvature of the right portion. As shown in FIGURE 10, each of the hoes 100 to 116, inclusive, is a plate of generally T-shape having a generally horizontal arm like the arm 116' illustrated and an upwardly extending control horn like the horn 116" shown in FIGURE 10. To each of these horns is connected an actuator, preferably of the fluid pressure type, including a plunger rod 117 reciprocable in a cylinder 118. The cylinders are pivotally mounted on rods 119, 120, 121 and 122 extending between supports 123 at opposite sides of the machine which are mounted on the upper frame portion 124. This upper frame portion is supported by upright posts 125 at one end and somewhat inclined posts 126 at the opposite end. The posts 126 are in turn supported on a transverse tubular member 127 carried by upright legs 128 of the lower frame.

The actuators 117, 118 are swingably mounted on the bars 119, 120, 121 and 122 and are pivotally connected to the respective horns by pivots 129. As the actuators are adjusted in effective length, the hoes will be moved upward or downward as the generally horizontal arms of the hoe plates swing about the axis of the mounting shaft 130, which is supported from the frame by the arms 131 shown in FIGURE 10. If it is desired to be able to raise the hoes clear of the path of travel of the slab S through the machine, the actuators 117, 118 should be of the double acting type so that fluid can be supplied to the cylinders to shorten the actuators. Whether or not the actuators are capable of exerting such an upward force to lift the hoes, they should be capable of exerting a downward force to press the hoes against the bark surface of the slab S with sufficient force to remove the bark effectively. The hoes in the modified barking machine of FIGURES 9 to 17, inclusive, like the hoes in the machine shown in FIGURES 1 to 8, inclusive, will be arranged in closely packed face-to-face relationship with each hoe stepped relative to its adjacent hoe, as shown best in FIGURES 13 and 15, so that together the hoes form a segmented plow. The hoes will be stepped so that the central hoes engage the slab first as it is moved through the machine in the direction indicated by the arrow in FIGURE 10.

Not only are the lower ends of the hoes beveled as stated above, and shown in FIGURES 14 and 16, but the upright edges of the hoes closer to the feed side of the machine are disposed in planes which are inclined both downward in the direction of slab feed, as shown in FIGURES 10 and 13, and also at an angle such that the inner edge of each hoe is closer to the feed end of the machine than the outer edge, as shown in the horizontal sectional view of FIGURE 15. The corner of the hoe designated B in FIGURE 17 which is defined by the intersection of the plane of the upright hoe edge closer to the feed end of the machine and the plane of the beveled end of the hoe defines the barking corner of the hoe. This corner slopes outwardly and downwardly from the inner face of the hoe and will conform approximately to the contour of the surface of an average slab which it engages. Such corner will be raised into engagement with the bark surface of a slab by the leading end of the slab striking the edge of the hoe closer to the feed end of the machine.

While, as in the type of barking machine shown in FIGURES 1 to 8, inclusive, the actuators 117, 118 could be designed to limit the downward swinging of the hoes about the pivot of shaft 130, it is preferred that separate stop means to limit downward movement of the hoes be provided. Such stop means are shown in detail in FIGURES 11 and 12. Each hoe plate has a projection 131 from its swinging edge which is engageable with a stop bar 132, the opposite ends of which are carried by slides 133 at opposite sides of the barking machine. These slides are supported by rods 134 extending through a portion of the superstructure 124 of the machine and which preferably are movable slightly as permitted by the compression springs 135 and 136 shown in FIGURES 9 and 10. If one or more of the hoes drops, therefore, such as when it rides off the trailing end of a slab, the impact of the projection 131 on the bar 132 will be cushioned somewhat by the resilience of the springs. In addition, a rubber pad may be mounted on the upper side of the stop bar, if desired, as shown in FIGURE 12. The lower side of this stop bar may be inclined, as shown in FIGURES 11 and 12, so that the same stop bar would also limit upward movement of the hoe. The lower side of the stop bar also may have on it a rubber pad to cushion the impact of a hoe with it. Upward impact of a hoe with the stop bar would also be cushioned by the lower springs 136 extending around the rods 134 supporting the stop bar.

Slabs are fed through the machine shown in FIGURES 9 to 17, inclusive, in a manner similar to that described in connection with the barking machine of FIGURES 1 to 8. A slab conveyor is formed by a chain 137 which carries slab gripping and supporting bars 138. The chain in turn is carried by sprockets 139 mounted respectively on shafts 140 and 141, shown in FIGURES 9 and 10. The shaft 141 is driven by suitable drive mechanism which in turn drives shaft 140. On this latter shaft is a gear 142 meshing with a gear 143 on shaft 144. On this shaft is mounted a sprocket engaged with a chain 145 which is also engaged with a sprocket on shaft 146 to turn it. The shaft 146 carries another sprocket engaged with chain 147 which also engages another sprocket on shaft 148 to turn such shaft. Shaft 148 mounts the slab hold-down roller 149 and in turn is journaled in the swinging end of a frame 150 swingable about the axis of shaft 146. Such hold-down roller is thus rotated positively in the direction indicated by the arrow to assist the slab conveyor in feeding a slab through the machine. Also, such hold-down roller can move upward and downward as necessary to accommodate and bear on slabs of different thickness.

In order to increase the traction of the hold-down roller 149, actuators including piston rods 151 and fluid pressure cylinders 152 can be provided to exert a downward force on the frame 150. Such actuators are preferably located one at each side of the machine and are connected to the frame 150 by pivots 153. These actuators in turn are supported and react from the superstructure 124 of the machine by pivots 154. When it is desired to raise the hold-down roller from the path of the slab through the barking machine, fluid under pressure, preferably compressed air, will be supplied to the lower ends of the cylinders 152 to move the piston rods 151 upward and swing the hold-down roller 149 upward correspondingly. On the other hand, when it is desired to increase the pressure of the hold-down on the slab, fluid under pressure will be supplied to the upper ends of the cylinders 152 for the purpose of forcing downward the pistons within them and the piston rods 151. It will be noted that the generally horizontal arms 116′ of the hoes are curved upward to provide clearance for upward movement of the hold-down.

As shown in FIGURE 9, it is preferred that the hold-down roller 149 and the supporting frame 150 be made in two parts so that the parts can swing independently about the axis of shaft 146. Such parts also are shown as being driven independently by chains 147. Such a construction enables the hold-down roller sections to engage the slab at two locations, if it is not exactly symmetrical, and this operation is particularly desirable where the slab is of generally quadrant shape in cross section like the slab shown in FIGURE 8. Also, as seen best in FIGURE 10, the hold-down roller has bars projecting from it that are somewhat inclined so that sharp corners are formed to dig into the bark surface for increasing the feeding traction of the hold-down rollers on the slab. As in the construction previously described, such bars or cleats have between them slots affording access to the central portion of the roller so that bark will not pack between the bars.

In order to increase the traction on the slab still further, an additional hold-down roller 155 may be mounted at the discharge side of the segmented plow. This roller preferably has a smooth periphery and its shaft 156 is mounted in the swinging ends of arms 157 which are mounted by pivots 158 on the machine frame. As shown in FIGURES 10 and 11, the arms 157 are bent to enable the hold-down roller to swing up and down without the movement of the arms being limited too greatly by engagement with the stop bar 132.

The machine shown in FIGURES 9 to 17, inclusive, has projections 159 and 160 mounted on the sides of the frame for engagement by the side hoe plates 116 to limit their separating movement. As explained in connection with the previous form of the machine, therefore, the hoes will be maintained in intimate face-to-face relationship despite the wedging force tending to move them outward, which is produced by the pressure of the hoes on the sloping sides of a slab.

The operation of both types of barking machine is generally the same. The slab conveyor and the hold-down roller cooperate to move the slab lengthwise through the machine and move the hoes upward until their barking corners engage the bark side of the slab. The scraping action of the hoes then shears the bark from the slab while the hoes move up and down individually relative to each other to maintain intimate contact with the slab despite the irregularity of its shape or the presence of projections on the slab. The fluid pressure in the actuators connected to the hoe plates will be maintained and perhaps adjusted as desirable from time to time to insure that the hoes engage the slab with sufficient pressure to remove the bark effectively from the slab but with minimum mutilation of the wood.

When a slab of generally quadrant shape is being barked, as shown in FIGURE 8, one or more of the outer hoes will extend alongside the upright flat surface as shown so as to prevent the slab from being pushed over by the wedging action of the other hoes engaging the slab surface. Consequently, such hoes 7 and 8 in their down position will serve as guides to maintain the direction of movement of the slab through the machine in a straight line.

I claim as my invention:

1. A slab barking machine comprising a frame, generally horizontal slab-supporting means carried by said frame, a segmented barking plow of generally chevron-shaped horizontal cross section and engageable with a slab on said slab-supporting means, and having its central portion leading and flaring therefrom toward its side portions, said plow including a cluster of hoe plates having downwardly projecting hoes disposed with their principal surfaces in adjacent parallel face-to-face relationship, successive hoes being stepped edgewise to form such chevron-shaped plow, pivot means supporting said hoe plates from said frame for upward and downward movement of each hoe individually relative to the other hoes, and means effecting relative movement of said barking plow and said slab-supporting means lengthwise of a slab on said slab-supporting means and substantially parallel to the principal faces of said hoes for effecting barking of such slab by said hoes.

2. A slab barking machine comprising a frame, generally horizontal slab-supporting means carried by said frame, a segmented barking plow of generally chevron-shaped horizontal cross section and engageable with a slab on said slab-supporting means and having its central portion leading and flaring therefrom toward its side portions, said plow including a cluster of hoe plates each of generally T-shaped profile disposed with their principal surfaces in adjacent parallel face-to-face relationship, each of said T-shaped plates including a generally horizontal supporting arm forming the stem portion of the T-shaped plate, a hoe projecting downward from said arm and a control horn projecting upward from said arm, said hoe and said horn cooperatively forming the cross-member of the T-shaped plate, said hoes being stepped edgewise successively rearwardly from said plow central portion in forming such chevron-shaped plow, pivot means supporting said generally horizontal supporting arms from said frame for upward and downward movement of each hoe individually relative to the other hoes, means engageable with said control horns for exerting a force thereon tending to swing said plates about said pivot means toward said slab-supporting means, and means effecting relative movement of said barking plow and said slab-supporting means lengthwise of a slab on said slab-supporting means and substantially parallel to the principal faces of said hoes for effecting barking of such slab by the lower ends of said hoes.

3. The slab barking machine defined in claim 2, in which the means engageable with the control horns are fluid pressure actuators operable to exert a pressure on the control horns toward the slab-supporting means to increase the pressure of the ends of the bar projections on a slab being barked.

4. The slab barking machine defined in claim 2, in which the means engageable with the control horns are fluid pressure actuators operable to exert a force on the control horns away from the slab-supporting means to swing the generally horizontal arms upward and lift the hoes away from the slab-supporting means, and further operable to exert a pressure on the control horns toward the slab-supporting means to increase the pressure of the hoes on a slab being barked.

5. A slab barking machine comprising a frame, generally horizontal slab-supporting means carried by said frame, a cluster of hoe plates each of generally T-shaped profile disposed with their principal surfaces in parallel adjacent face-to-face relationship, each of said T-shaped plates including a generally horizontal supporting arm and forming the stem portion of the T-shaped plate, a hoe projecting downwardly from said arm and a control horn projecting upwardly from said arm, said hoe and said horn being in generally upright alignment and co-operatively forming the cross member of the T-shaped plate, such horizontal supporting arm stem portion and said cross member of each plate being approximately equal in length, pivot means pivotally supporting said generally horizontal supporting arms from said frame for upward and downward movement of the hoes, and means effecting relative movement of said hoes and said slab-supporting means lengthwise of a slab on said slab-supporting means and substantially parallel to the principal faces of said hoe plates for effecting barking of such slab by the lower ends of said hoes.

6. The slab barking machine defined in claim 5, in which the generally horizontal arms are arched and a hold-down roller engageable with a slab on the slab-supporting means is disposed beneath such arms close to the hoes, the arched shape of such arms providing clearance for the hold-down roller.

7. A slab barking machine comprising a frame, generally horizontal slab-supporting means carried by said frame, a cluster of hoe plates packed together with their principal faces in parallel, substantially abutting face-to-face relationship and having downwardly projecting hoes engageable with a slab on said slab-supporting means, elongated fluid-pressure actuators, one for each of said hoe plates, supported from said frame in a cluster above such cluster of hoe plates with their lengths substantially parallel and connected respectively to said hoe plates, each of said actuators being of a width perpendicular to said hoe plates greater than the thickness of the plate to which it is connected, actuators disposed in adjacent relationship transversely of said plates being offset in the direction parallel to said plates and the connections of such adjacent actuators to their respective plates being correspondingly offset, said actuators being operable to exert downward pressure on said plates for pressing said hoes against a slab on said slab-supporting means, and means effecting relative movement of said hoes and said slab-supporting means lengthwise of a slab on said slab-supporting means and substantially parallel to the principal faces of said hoe plates for effecting barking of such slab by said hoes.

References Cited in the file of this patent

UNITED STATES PATENTS

| | | |
|---|---|---|
| 2,452,631 | Cameron | Nov. 2, 1948 |
| 2,492,321 | Roberts | Dec. 27, 1949 |
| 2,794,465 | Gyllenberg | June 4, 1957 |
| 2,800,935 | Hosmer | July 30, 1957 |
| 2,830,630 | Uhlenkott | Apr. 15, 1958 |

FOREIGN PATENTS

| | | |
|---|---|---|
| 132,631 | Sweden | Aug. 7, 1951 |
| 664,771 | Great Britain | Jan. 9, 1952 |